US012572092B2

(12) United States Patent
Hachisuga et al.

(10) Patent No.: US 12,572,092 B2
(45) Date of Patent: Mar. 10, 2026

(54) OPTICAL DEVICE, IMAGE READING DEVICE, AND ASSEMBLING METHOD

(71) Applicant: FUJIFILM Business Innovation Corp., Tokyo (JP)

(72) Inventors: Masaki Hachisuga, Kanagawa (JP); Hiroshi Sawada, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 472 days.

(21) Appl. No.: 18/155,514

(22) Filed: Jan. 17, 2023

(65) Prior Publication Data

US 2024/0069479 A1 Feb. 29, 2024

(30) Foreign Application Priority Data

Aug. 29, 2022 (JP) ................................. 2022-136028

(51) Int. Cl.
| | |
|---|---|
| *G03G 15/14* | (2006.01) |
| *G02B 3/00* | (2006.01) |
| *G02B 26/08* | (2006.01) |
| *G03G 15/16* | (2006.01) |
| *H04N 1/04* | (2006.01) |

(52) U.S. Cl.
CPC ....... *G03G 15/1605* (2013.01); *G02B 3/0075* (2013.01); *G02B 26/08* (2013.01); *H04N 1/04* (2013.01)

(58) Field of Classification Search
CPC ... G03G 15/1605; G02B 3/0075; G02B 26/08
See application file for complete search history.

(56) References Cited

U.S. PATENT DOCUMENTS

| | | | |
|---|---|---|---|
| 9,524,996 B2 | 12/2016 | Fujiuchi et al. | |
| 2013/0229714 A1* | 9/2013 | Kubota .................. | B05D 3/067 |
| | | | 359/601 |
| 2016/0133661 A1 | 5/2016 | Fujiuchi | |
| 2019/0379801 A1* | 12/2019 | Matsuzawa ............ | G03B 27/54 |

FOREIGN PATENT DOCUMENTS

| | | |
|---|---|---|
| JP | 2003-302504 A | 10/2003 |
| JP | 6049858 B2 | 12/2016 |

* cited by examiner

*Primary Examiner* — Ibrahim Siddo
(74) *Attorney, Agent, or Firm* — Oliff PLC

(57) ABSTRACT

An optical device includes: a radiation portion that sends light toward a predetermined position; a lens body including plural lenses that are arranged in an array direction and on which reflection light reflected at the predetermined position is incident; a first support body having a light limiting portion and supporting the radiation portion, the light limiting portion extending in the array direction on the incident side of reflection light relative to the lens body, the light limiting portion limiting incidence of at least a portion of light having an influence on an image based on reflection light; and a second support body supporting the lens body and being movable, relative to the first support body, in an optical axis direction of reflection light.

11 Claims, 9 Drawing Sheets

FIG. 5A

OBJECT POINT

TC

74

L2

IMAGE POINT

FIG. 5B

OBJECT POINT

P          71

L1

TC

J

74

L2

IMAGE POINT

FIG. 5C

OBJECT POINT    71

P

L1

TC

74

L2

IMAGE POINT

OPTICAL DEVICE, IMAGE READING DEVICE, AND ASSEMBLING METHOD

CROSS-REFERENCE TO RELATED APPLICATIONS

This application is based on and claims priority under 35 USC 119 from Japanese Patent Application No. 2022-136028 filed Aug. 29, 2022.

BACKGROUND

(i) Technical Field

The present disclosure relates to an optical device, an image reading device, and an assembling method.

(ii) Related Art

For example, Japanese Unexamined Patent Application Publication No. 2003-302504 discloses an optical device including a lens array unit including: at least one lens array including plural lenses that are arranged in a row and having plural first lens surfaces for light incidence and plural second lens surfaces for light outgoing; and a first light shielding mask having plural through holes that pass through in the axial length direction of the lenses and covering the front face of the lens array so that the plural through holes are positioned in front of the respective first lens surfaces. The lens array unit further includes a second light shielding mask having plural through holes that pass through in the axial length direction of the lenses and disposed behind the lens array so that the plural through holes are positioned behind the respective second lens surfaces.

SUMMARY

Here, improvement in an image based on the reflection light is enabled by, relative to a predetermined position, positioning: the plural arrayed lenses on which reflection light reflected at the predetermined position is incident; and a light limiting portion that limits the light incident on the lenses.

Aspects of non-limiting embodiments of the present disclosure relate to improving an image based on reflection light compared with when no light limiting portion is provided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an optical device including: a radiation portion that sends light toward a predetermined position; a lens body including plural lenses that are arranged in an array direction and on which reflection light reflected at the predetermined position is incident; a first support body having a light limiting portion and supporting the radiation portion, the light limiting portion extending in the array direction on the incident side of reflection light relative to the lens body, the light limiting portion limiting incidence of at least a portion of light having an influence on an image based on reflection light; and a second support body supporting the lens body and being movable, relative to the first support body, in an optical axis direction of reflection light.

BRIEF DESCRIPTION OF THE DRAWINGS

Exemplary embodiments of the present disclosure will be described in detail based on the following figures, wherein:

FIG. 3A is a perspective view of one example, and FIG. 3B is a perspective view of another example;

FIG. 4A illustrates a form in which the reflection light reflected off a document on a transparent plate is received by light receiving elements of a light receiving board, and FIG. 3B illustrates the optical properties of the microlens array;

FIG. 5A, FIG. 5B, and FIG. 5C illustrate the adjustment of the microlens array on a time-series basis;

FIG. 6A illustrates one housing of the housing body, and FIG. 6B illustrates the positional adjustment of the housing relative to the other housing;

FIG. 7A is a side view illustrating the positional relationship between the housing body and a transparent plate, and FIG. 7B is a front view illustrating the positional relationship between the housing body and a transparent plate;

FIG. 8A illustrates schematically the configuration of the housing body, and FIG. 8B illustrates, in the housing body, the assembly of one housing and the other housing; FIG. 9A illustrates schematically the configuration of the housing body, and FIG. 8B illustrates the assembly of a microlens array in a housing of the housing body.

DETAILED DESCRIPTION

Image Forming Apparatus 100

Figure 1:
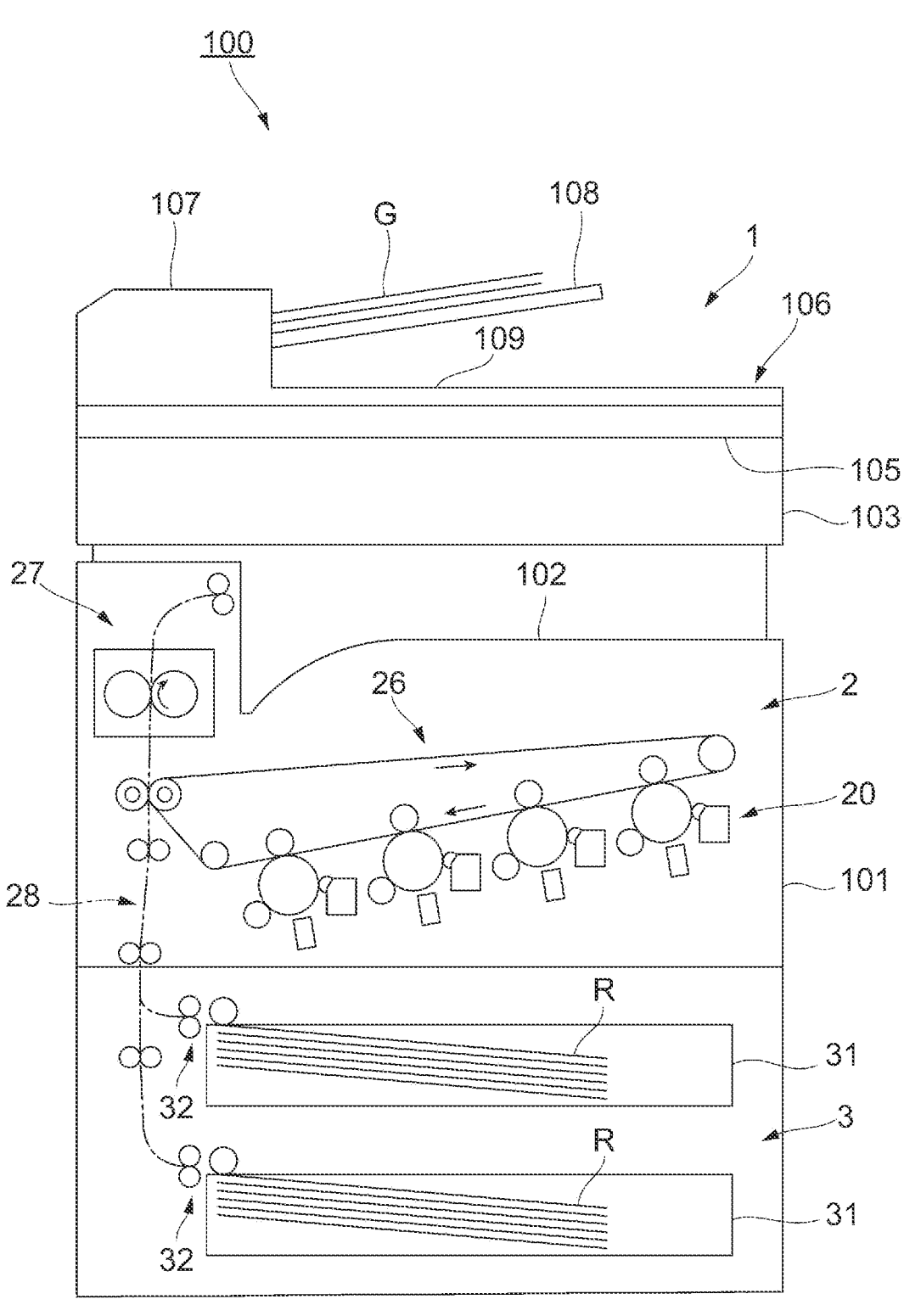
FIG. 1 illustrates schematically the configuration of an image forming apparatus to which an exemplary embodiment of the present disclosure is applied.

Hereinafter, exemplary embodiments of the present disclosure will be described in detail with reference to the accompanying drawings. Note that the sizes and thicknesses, for example, of parts illustrated in the drawings referred to in the following description are sometimes differ from the dimensions of the actual parts.

FIG. 1 illustrates schematically the configuration of an image forming apparatus 100 to which an exemplary embodiment of the present disclosure is applied.

As FIG. 1 illustrates, the image forming apparatus 100 includes: a document reading device 1 that reads the information about a document G; an image forming section 2 that forms an image on a recording sheet R based on the information (read image) about the document G read by the document reading device 1; and a sheet feed unit 3 that feeds the recording sheet R that is supplied to the image forming section 2. In the image forming apparatus 100, the image forming section 2 and the sheet feed unit 3 are accommodated inside an apparatus body 101 whereas the document reading device 1 is disposed on the upper side relative to the apparatus body 101. The apparatus body 101 has a discharge accommodation portion 102. The recording sheet R with an image is discharged onto an upper surface portion of the discharge accommodation portion 102 and accommodated on the upper surface portion.

The document reading device 1 has a housing 103. The document reading device 1 further includes: a document table 105, on an upper surface portion of the housing 103, that has a light-transmitting property and on which the document G is placed; and a document covering part 106 that is capable of covering the document table 105 and performing an opening and closing operation relative to the housing 103. The document covering part 106 is provided with: an automatic document transport unit 107 that transports the document G to a reading position and discharges the document G that has been read; a document tray 108 on which the document G to be transported by the automatic document transport unit 107 is placed; and an accommodation portion 109 on which the document G that has been discharged from the automatic document transport unit 107 is accommodated.

The image forming section 2 includes: image forming units 20 that form toner images of the colors: yellow (Y), magenta (M), cyan (C), and black (K) by, for example, an electrophotographic system; an intermediate transfer unit 26 that transports the toner images formed at the image forming units 20 until the toner images are transferred onto the recording sheet R; and a fixing unit 27 that fixes, to the recording sheet R, the toner images that have been transferred from the intermediate transfer unit 26 onto the recording sheet R. Note that, other than the electrophotographic system, the image forming section 2 may employ, for example, an ink jet system.

The sheet feed unit 3 includes: storage bodies 31 that are drawers capable of storing plural recording sheets R in predetermined different sizes and types; and feeders 32 that feed, one by one, the recording sheets R stored in the storage bodies 31 to a transport path. Between the sheet feed unit 3 and the image forming section 2, a feed transport path 28 through which the recording sheet R that has been fed from the sheet feed unit 3 is transported to a secondary transfer position.

The basic operation of the image forming apparatus 100 will be described next.

First, at the document reading device 1, a user places a document G on any one of the document table 105 and the document tray 108. Subsequently, when the user operates, for example, an operation button (not illustrated) to provide a document reading instruction to the document reading device 1, the document reading device 1 starts reading the document G in response to the instruction. That is, the document reading device 1 receives the reading information about the document G. The image forming section 2 then performs an image forming operation based on the reading information about the document G received from the document reading device 1. At this time, the sheet feed unit 3 feeds a recording sheet R in accordance with the operation of the image forming section 2. Subsequently, the image forming section 2 fixes toner images to the recording sheet R, and the recording sheet R is then discharged to the discharge accommodation portion 102. The above-described image forming operation is repeated in a similar manner by the number of documents G or the number of images to be formed on sheets.

Document Reading Device 1

Figure 2:
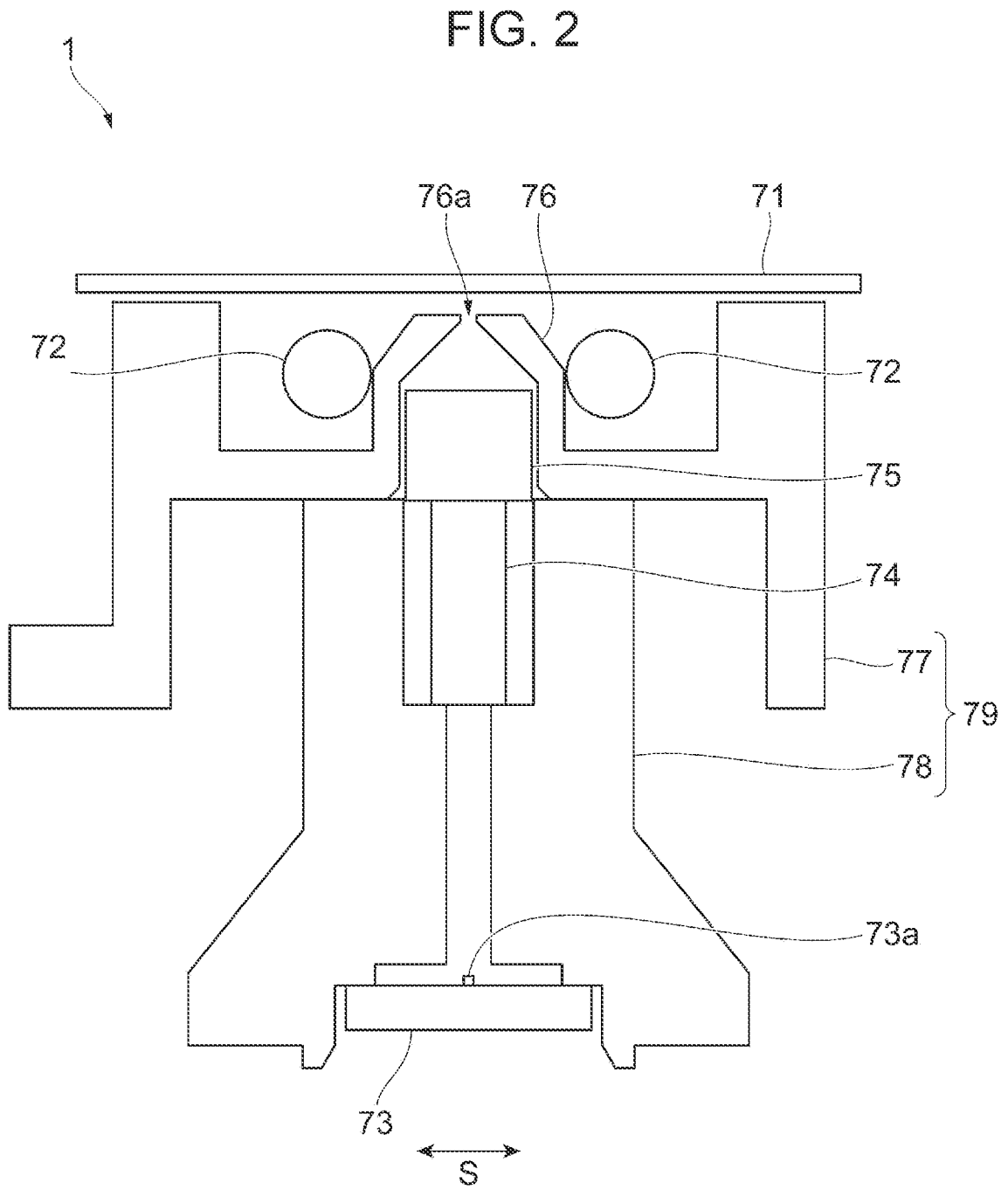
FIG. 2 illustrates schematically the configuration of an image reading device to which an exemplary embodiment of the present disclosure is applied.

Next, the document reading device 1 to which an exemplary embodiment of the present disclosure is applied will be described with reference to FIG. 2. The document reading device 1 is an example of an optical device. In FIG. 2, a sub-scan direction S is given.

FIG. 2 illustrates schematically the configuration of the document reading device 1 to which an exemplary embodiment of the present disclosure is applied, and a main scan direction in FIG. 2 is orthogonal to the plane of paper on which FIG. 2 is illustrated.

As FIG. 2 illustrates, the document reading device 1 is provided with: a transparent plate 71 that supports, on the upper surface thereof, a document (not illustrated) to be read; light guides 72 that guide the light of a light source to the document; and a light receiving board 73 having light receiving elements 73a that receive the reflection light reflected off the document.

The light guides 72 are arranged so that, when light is sent toward the document in one direction, light is also sent toward the document in another direction.

The light receiving board 73 is positioned farther away from the transparent plate 71 than the light guides 72. At the light receiving board 73, the light receiving elements 73a are arranged in a row in the main scan direction, while spaced apart from one another, and receives reflection light.

The document reading device 1 further includes: a microlens array 74 including plural minuscule microlenses; and a first light shielding wall 75 and a second light shielding wall 76 that shield unwanted reflection light that is not intended to be incident on the microlenses.

The microlens array 74 is disposed so as to be long in the main scan direction.

Each of the first light shielding wall 75 and the second light shielding wall 76 that are long in the main scan direction is positioned on the side on which light enters the microlens array 74, and limits the light that enters each of the microlenses of the microlens array 74 by light shielding. The second light shielding wall 76 has a slit portion 76a extending in a direction perpendicular to the paper plane, that is, a main scan direction L (for example, refer to FIGS. 3A and 3B) intersecting the sub-scan direction S.

The slit portion 76a is formed so that a slit between end portions, of the slit portion 76a, close to the transparent plate 71 is narrow. Although the slit portion 76a and a housing 77 (described later) are formed as one body in an exemplary embodiment of the present disclosure, this is not the only option, and the slit portion 76a and the housing 77 may be formed as separated bodies. Note that there may be a modification in which the slit portion 76a is omitted.

The document reading device 1 further includes a housing body 79 provided with the light guides 72, the light receiving board 73, the microlens array 74, the first light shielding wall 75, and the second light shielding wall 76.

In further detail, the housing body 79 is divided into the housing 77 positioned close to the transparent plate 71 and a housing 78 positioned farther away from the transparent plate 71 than the housing 77. The housing 77 holds the light guides 72. The housing 77 and the second light shielding wall 76 are formed as one body. The housing 78 holds the light receiving board 73, the microlens array 74, and the first light shielding wall 75.

With the housing body 79, the light receiving board 73, the microlens array 74, the first light shielding wall 75, and the second light shielding wall 76 are positioned relative to the transparent plate 71.

The transparent plate 71 is an example of a light transmitting member. Each of the light guides 72 is an example of a radiation portion, and the microlens array 74 is an example of a lens body. The housing 77 is an example of a first support body, and the second light shielding wall 76 is an example of a light limiting portion. The housing 78 is an example of a second support body.

Figure 3A:
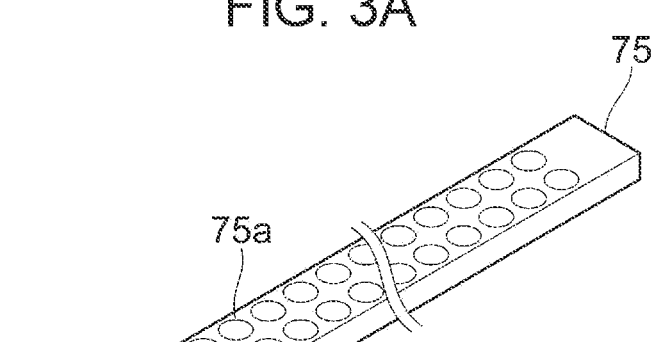
FIG. 3A and FIG. 3B illustrate examples of the configuration of a first light shielding wall, that is.
Figure 3B:
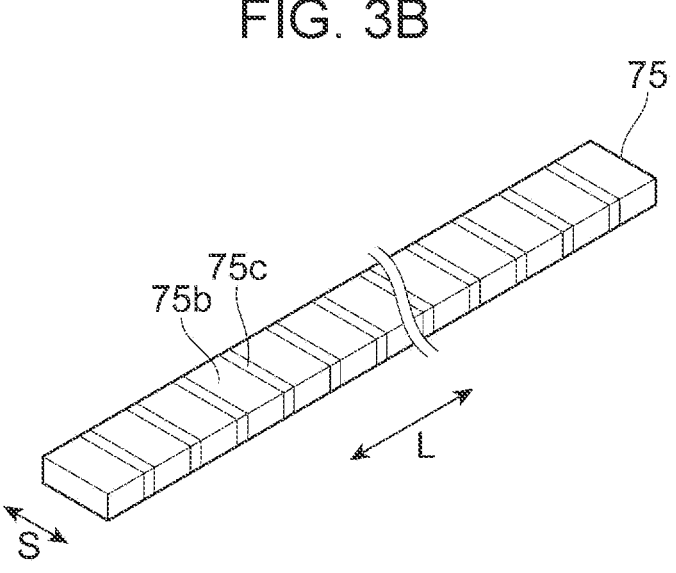

FIG. 3A and FIG. 3B illustrate examples of the configuration of the first light shielding wall 75, that is, FIG. 3A is a perspective view of one example, and FIG. 3B is a perspective view of another example.

The first light shielding wall 75 illustrated in FIG. 3A as one example is made of, for example, a black synthetic resin having a light shielding property, and the first light shielding wall 75 is substantially in the shape of a plate or a block that extends in one direction. The first light shielding wall 75 has plural through holes 75a corresponding to the array of plural microlenses 74a and 74b of the microlens array 74 (refer to FIGS. 4A and 4B). The color of the inner wall surfaces of the through holes 75a are also black.

It is possible to produce the first light shielding wall 75 by resin molding with a mold and also possible to form the through holes 75a during the resin molding; however, the through holes 75a may alternatively be formed by, for example, machining.

The first light shielding wall 75 illustrated in FIG. 3B as another example is formed so that light transmitting portions 75b transparent to light and light shielding portions 75c that shield light are alternately arranged in a continuous manner. The light transmitting portions 75b are made of a material such as glass or a transparent resin, and the light shielding portions 75c are made of a material such as light shielding film or black adhesive.

The first light shielding wall 75 is produced by a method in which an integrated body is formed so that one light shielding portion 75c is layered between two light transmitting portions 75b, and the integrated body is cut in predetermined dimensions. The first light shielding wall 75 is not produced by resin molding with a mold.

Figure 4A:
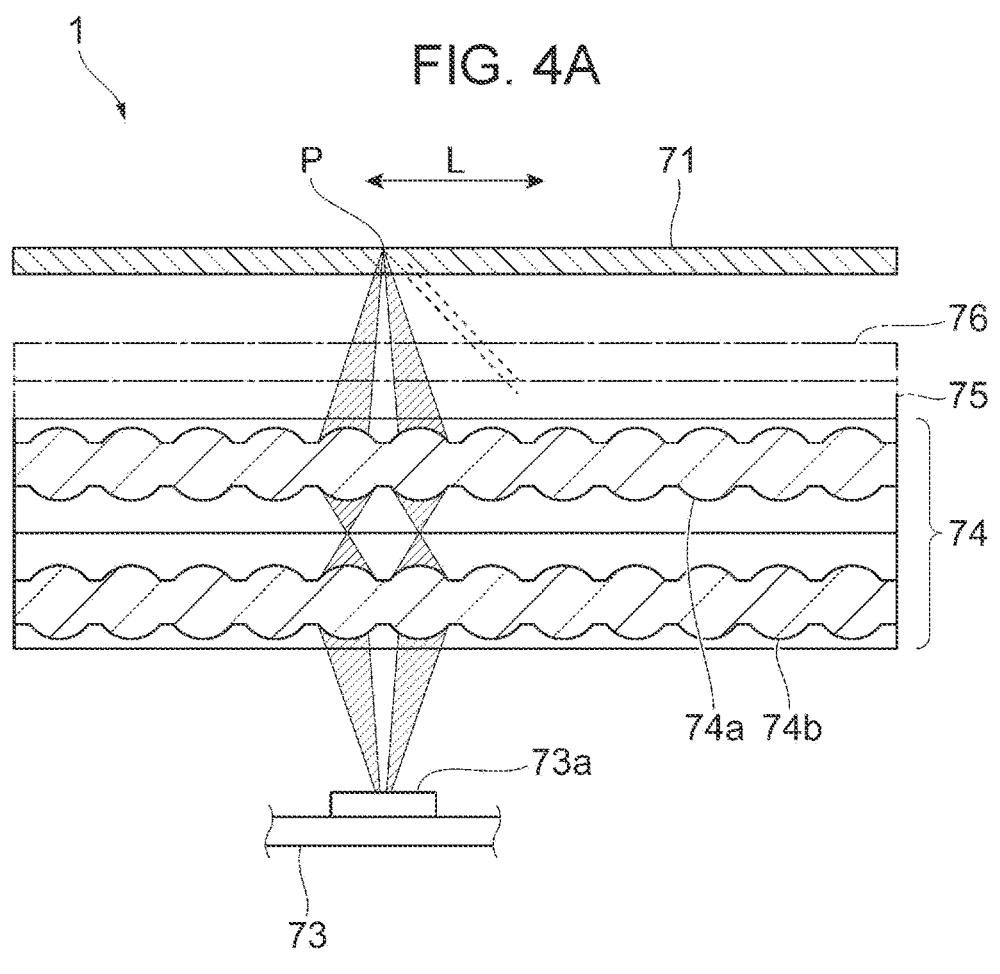
FIG. 4A and FIG. 4B illustrate a microlens array, that is.
Figure 4B:
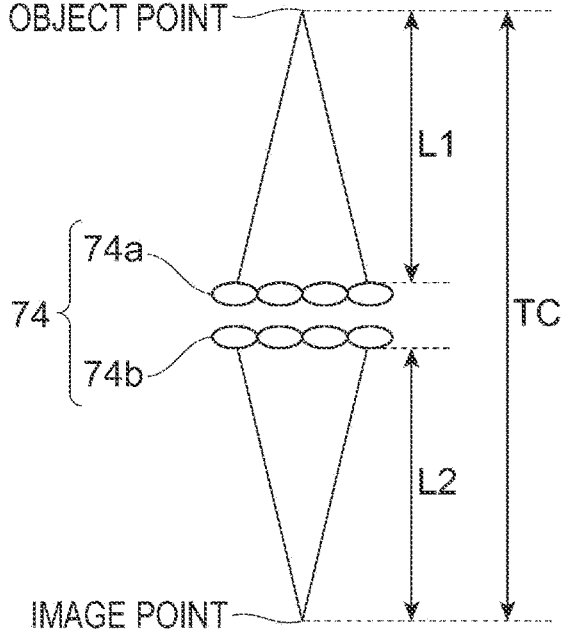

FIG. 4A and FIG. 4B illustrate the microlens array 74, that is, FIG. 4A illustrates a form in which the reflection light reflected off a document on the transparent plate 71 is received by the light receiving elements 73a of the light receiving board 73, and FIG. 3B illustrates the optical properties of the microlens array 74. FIG. 4A illustrates a section taken in a direction perpendicular to the paper plane of FIG. 2, and the first light shielding wall 75 and the second light shielding wall 76 are illustrated by the dot-and-dash lines. The main scan direction L is given in FIG. 4A.

The microlens array 74 illustrated in FIG. 4A is a two-lens array of an erect equal-magnification image formation type with which magnification variation when misregistration occurs is reduced. In the microlens array 74, an assembly of the microlenses 74a and an assembly of the microlenses 74b are each arranged in the main scan direction L so that the optical axes of the microlenses 74a and the optical axes of the respective microlenses 74b run along one another.

The first light shielding wall 75 is disposed between the transparent plate 71 and the microlens array 74 for a long focal depth. The above-described first light shielding wall 75 enables aperture reduction, that is, reduction in angular aperture and enables prevention of entrance of stray light (illustrated by the broken lines) into an adjacent microlens by limiting light incident obliquely. Thus, the optical performances of the lenses may be improved.

The second light shielding wall 76 shields a portion of the light from the light guides 72 (refer to FIG. 2) that is unnecessary for image formation, before such an unnecessary portion of the light reaches a document, and the second light shielding wall 76 is disposed between the transparent plate 71 and the first light shielding wall 75. The above-described second light shielding wall 76 may prevent internal reflection of the first light shielding wall 75 from occurring and may suppress faint character and formation of ink spread of a patch from being caused.

Through the microlens array 74, the light receiving elements 73a receive, in the reflection light reflected at a document reading position P that is set relative to the transparent plate 71, a portion not being shielded by the first light shielding wall 75 or the second light shielding wall 76.

The document reading position P is an example of a predetermined position. The microlenses 74a and 74b of the microlens array 74 are an example of plural lenses, and the main scan direction L is an example of an array direction.

As FIG. 4B illustrates, regarding the microlens array 74, there is a conjugate length TC (hereinafter, referred to as a "best conjugate length TC") with which best resolution at an image point is obtained. The best conjugate length TC is reduced when the curvature radii R of the microlenses 74a and 74b are reduced, and the best conjugate length TC is increased when an inter-lens distance is shortened.

In addition, a distance L1 between the microlenses 74a of the microlens array 74 and an object point are substantially the same as a distance L2 between the microlenses 74b and the image point. Light comes into a focus at the same position even though the microlenses 74a are closer to the object point, or the curvature radii R of the microlenses 74a and 74b are reduced.

Thus, when the position of any one of the object point and the image point is determined, the position of the other point is also determined.

Figures 5A, 5B, 5C:
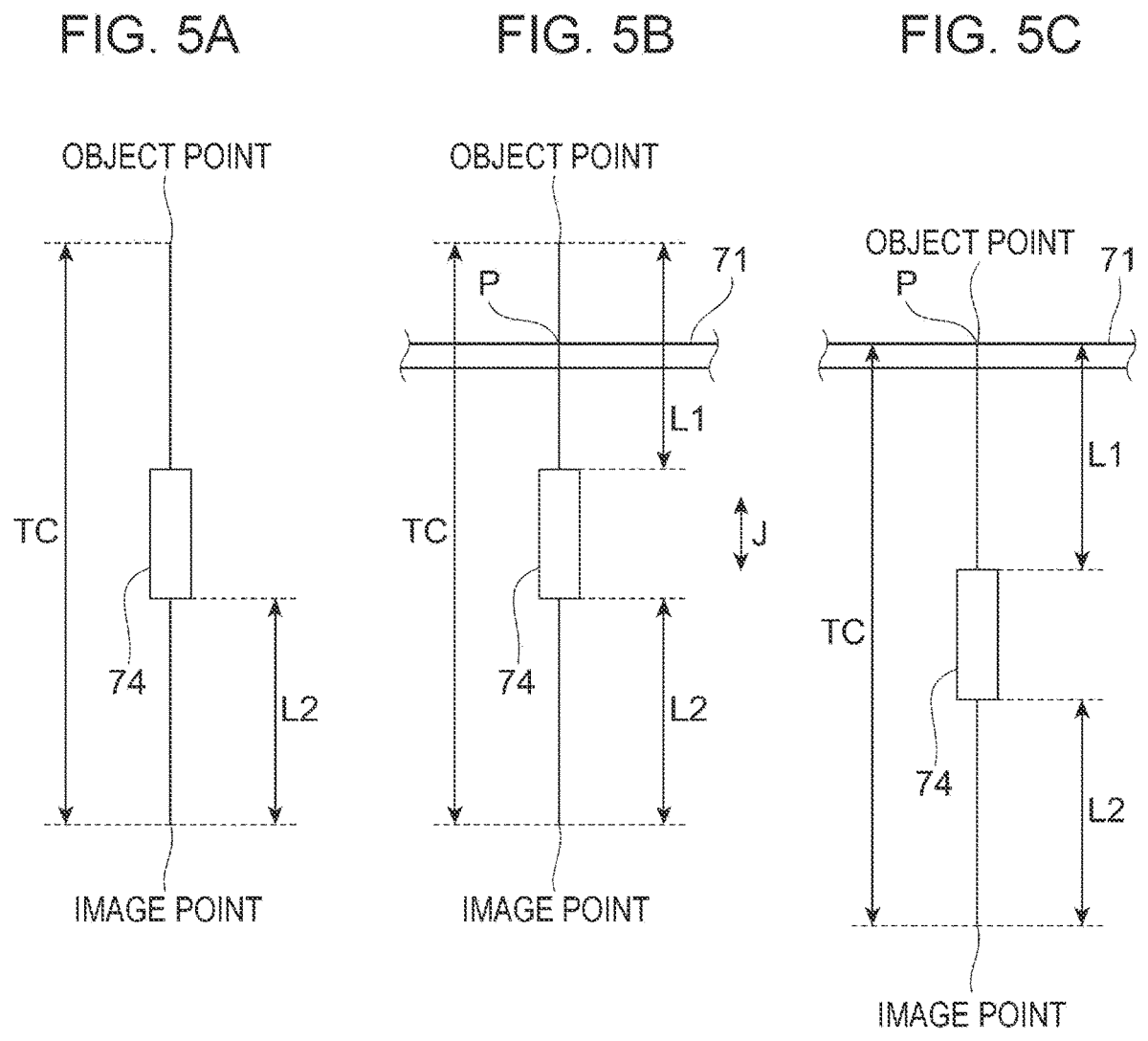

FIG. 5A, FIG. 5B, and FIG. 5C illustrate the adjustment of the microlens array 74 on a time-series basis.

As FIG. 5A illustrates, first, the distance L2 on the image point side is adjusted based on the conjugate length TC of the microlens array 74. Subsequently, as FIG. 5B illustrates, the microlens array 74 at a position at which the best conjugate length TC is maintained is mounted relative to the transparent plate 71; however, the positional relationship between the document reading position P set relative to the transparent plate 71 and the microlens array 74 is not determined. That is, the object point of the microlens array 74 deviates from the document reading position P.

Thus, as FIG. 5C illustrates, the microlens array 74 is moved in an optical axis direction J and positioned relative to the transparent plate 71 so that the object point of the microlens array 74 coincides with the document reading position P.

First Exemplary Embodiment

Figures 6A, 6B:
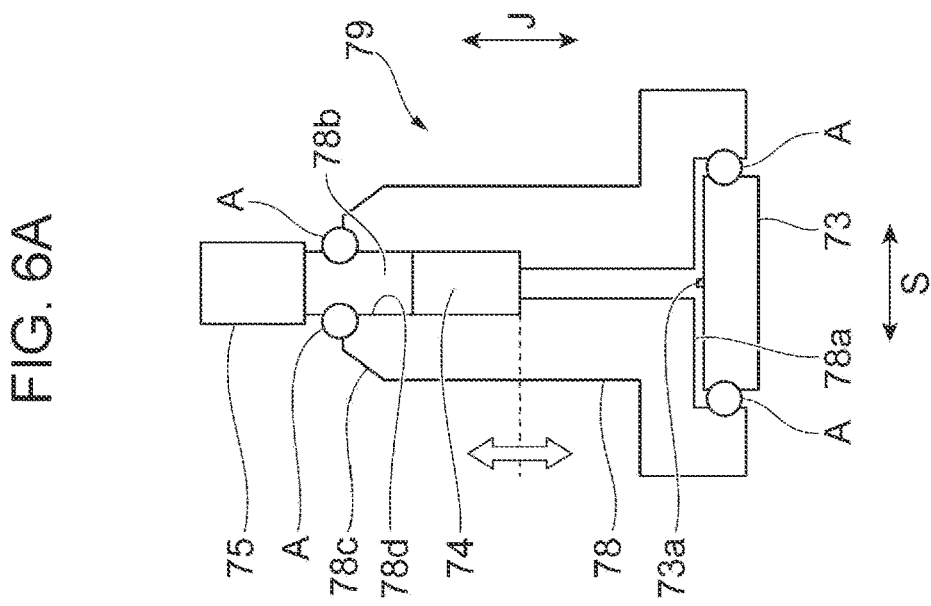
FIG. 6A and FIG. 6B illustrate a housing body according to a first exemplary embodiment, that is.

FIG. 6A and FIG. 6B illustrate a housing body 79 according to a first exemplary embodiment, that is, FIG. 6A illustrates a housing 78 of the housing body 79, and FIG. 6B illustrates the positional adjustment of the housing 78 relative to a housing 77. FIG. 6A and FIG. 6B illustrate the structure for positioning the microlens array 74 and correspond to FIG. 5A and FIG. 5B, respectively.

As FIG. 6A illustrates, the housing 78 of the housing body 79 according to the first exemplary embodiment has: a receiving portion 78a for receiving the light receiving board 73; a receiving portion 78b for receiving the microlens array 74; and an attachment portion 78c to which a first light shielding wall 75 is attached. The light receiving board 73, the microlens array 74, and the first light shielding wall 75 are arranged in order in the optical axis direction J.

As FIG. 6A illustrates, at the receiving portion 78*b*, the heights of the housing 78 and the microlens array 74 are adjusted based on the conjugate length TC (refer to FIG. 5A).

As FIG. 6B illustrates, the housing 77 of the housing body 79 according to the first exemplary embodiment has: a receiving portion 77*a* for receiving a light guide 72; and a receiving portion 77*b* for receiving the housing 78.

The receiving portion 77*b* of the housing 77 has facing surfaces 77*c* extending in the main scan direction (a direction perpendicular to the paper plane of FIG. 6B) intersecting the sub-scan direction S, and the facing surfaces 77*c* face the housing 78. A portion of the housing 78 is in contact with the facing surfaces 77*c*. Although the facing surfaces 77*c* of the housing 77 are illustrated as portions not in contact with the housing 78 in FIG. 6B, such illustration is merely for convenience of description.

With this configuration, it is possible to change the position of the housing 78 in relation to the position of the housing 77. Such positional change is performed in the optical axis direction J.

The housing 77 has a member to be in contact with the transparent plate 71 and is positioned relative to the transparent plate 71 by using the member. In this way, the housing 77 and the transparent plate 71 are positioned relative to one another.

The housing 78 is then inserted in the receiving portion 77*b* of the housing 77 and is positioned, relative to the housing 77, in the optical axis direction J. Such positioning may serve as height adjustment and focus adjustment.

The focus adjustment may be performed based on a predetermined dimension or based on the result obtained by the light receiving elements 73*a* of the light receiving board 73 detecting the light from the light guide 72.

After the height adjustment has been performed, the housing 78 is fixed to the housing 77 by a UV adhesive A. Note that a fixation method other than UV adhesion may be adopted.

Note that, although the housing 77 has the receiving portion 77*b* for receiving the housing 78 in the first exemplary embodiment, such a configuration is not the only option, and the position of the housing 77 may be changed relative to the housing 78 by the housing 78 having a receiving portion (not illustrated) for receiving the housing 77.

In further detail, the housing 78 is covered by the housing 77. More specifically, when the upper side of the paper of FIGS. 6A and 6B is the upper side in the optical axis direction J in FIGS. 6A and 6B, an upper portion of the housing 78 is covered by the housing 77.

As described above, although the housing 78 has such a portion to be covered by the housing 77 in the first exemplary embodiment, the housing 77 may alternatively be covered by the housing 78.

Second Exemplary Embodiment

Figures 7A, 7B:
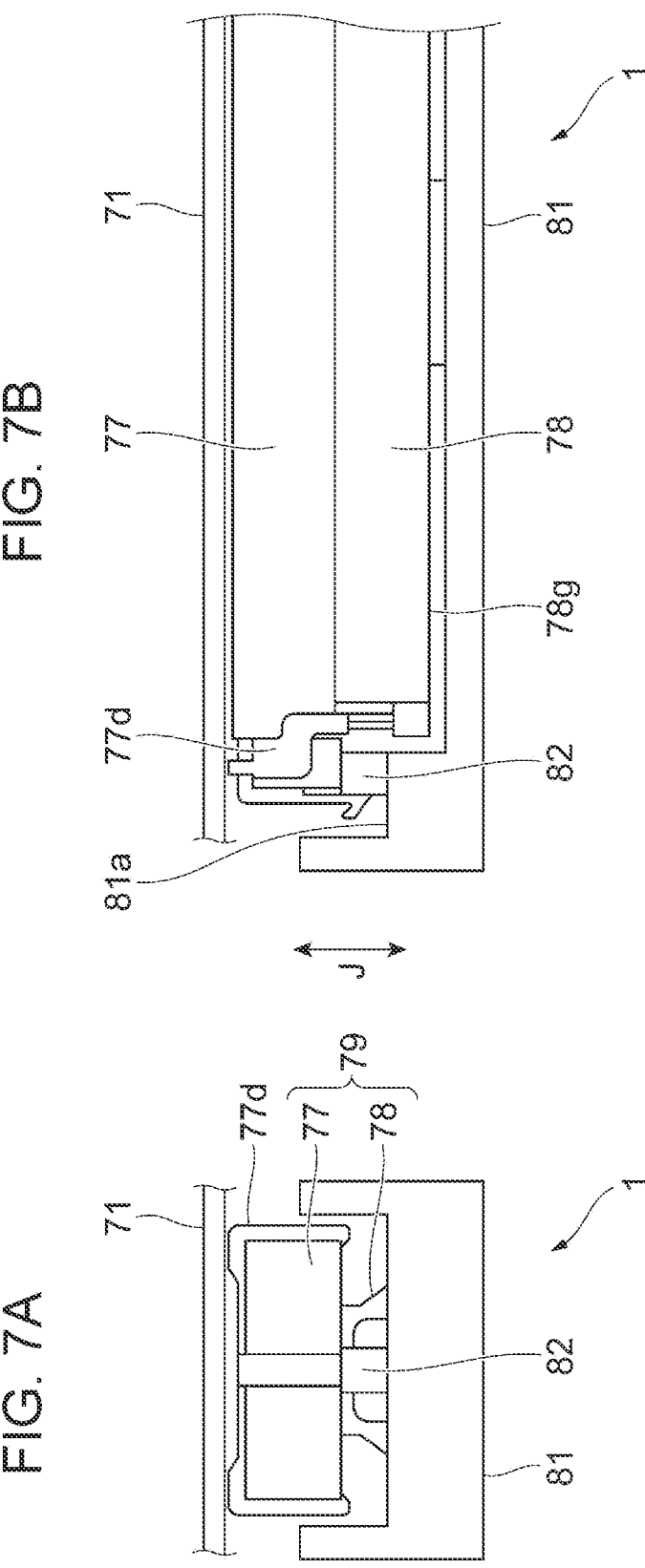
FIG. 7A and FIG. 7B illustrate a housing body according to a second exemplary embodiment, that is.

FIG. 7A and FIG. 7B illustrate a housing body 79 according to a second exemplary embodiment, that is, FIG. 7A is a side view illustrating the positional relationship between the housing body 79 and the transparent plate 71, and FIG. 7B is a front view illustrating the positional relationship between the housing body 79 and the transparent plate 71. Note that the housing body 79 according to the second exemplary embodiment includes elements common with those of the housing body 79 of the above-described first exemplary embodiment, and the illustration and the description of such common elements are sometimes omitted.

As FIG. 7A illustrates, the housing body 79 is held by a holding member 81 attached to a device body. Further, a compression coil spring 82 is provided between a housing 77 of the housing body 79 and the holding member 81. In addition, as FIG. 7B illustrates, abutting members 77*d* facing the transparent plate 71 are provided on both end portions of the housing 77. Each of the abutting members 77*d* of the housing 77 is pressed against the transparent plate 71 by a biasing force of the compression coil spring 82. The housing 77 is provided with a light guide 72 and formed integrally with a slit portion 76*a* (refer to FIG. 2). Thus, the positional relationship between: the light guide 72 and the slit portion 76*a* (refer to FIG. 2); and the transparent plate 71 or a subject to be read is maintained.

In addition, as FIG. 7B illustrates, the compression coil spring 82 is provided so as to be in contact with a flat surface portion 81*a* of the holding member 81. The flat surface portion 81*a* with which the compression coil spring 82 is in contact is positioned closer to the transparent plate 71 than an end portion 78*g*, of a housing 78, that is farther away from the transparent plate 71 than the other end portion in the optical axis direction J.

As described above, because the flat surface portion 81*a* is positioned close to the transparent plate 71, the compression coil spring 82 has a reduced spring length and may thereby be maintained in a further stable state and suppressed from vibrating and being moved by an external force.

In further detail, in the housing body 79, the housing 77 covers the housing 78. In other words, the housing 78 holding the microlens array 74 has a portion to be covered by the housing 77. Thus, when the document reading device 1 is disposed on the lower side relative to the transparent plate 71, the housing 77 on the upper side covers the housing 78 on the lower side, and dust may thereby hardly intrude inside the document reading device 1.

Although the housing 77 covers the housing 78 in FIGS. 7A and 7B, such a configuration is not the only option, and a configuration in which the housing 78 covers the housing 77 may be adopted. The configuration may be useful in preventing dust intrusion when the document reading device 1 is disposed on the upper side relative to the transparent plate 71.

Although reduction in the size of the housing 77 is difficult, reduction in the size of the housing 78 is possible, and further weight reduction of the housing 78 reduces the load on the driving side. Thus, it may be possible to reduce the cost for a drive unit.

Third Exemplary Embodiment

Figure 8A:
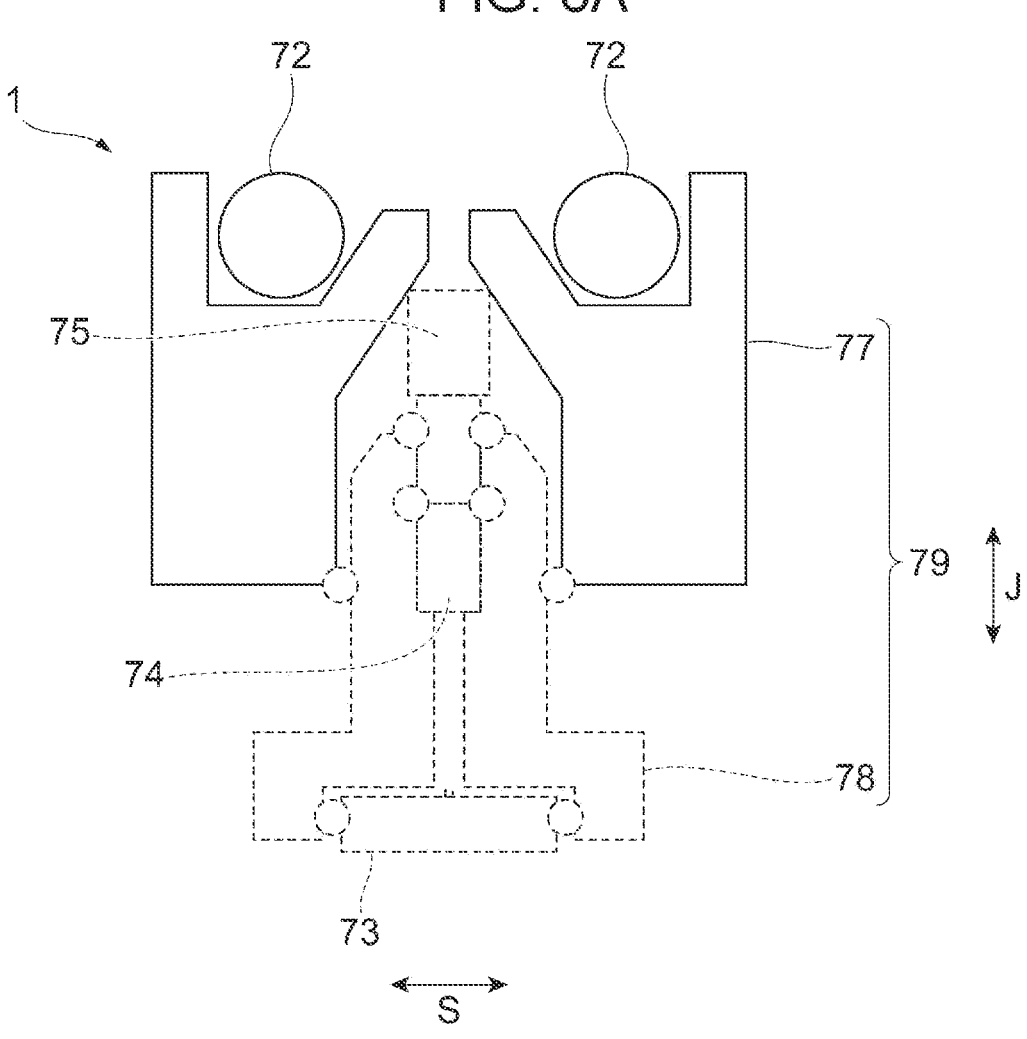
FIG. 8A and FIG. 8B illustrate a housing body according to a third exemplary embodiment, that is.
Figure 8B:
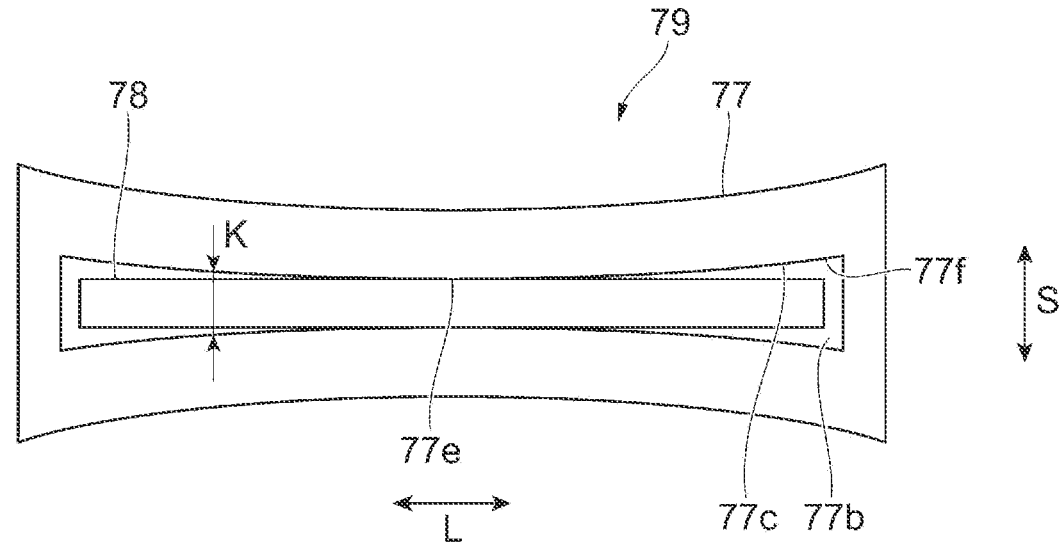

FIG. 8A and FIG. 8B illustrate a housing body 79 according to a third exemplary embodiment, that is, FIG. 8A illustrates schematically the configuration of the housing body 79, and FIG. 8B illustrates the assembly of a housing 77 and a housing 78 of the housing body 79. Note that FIG. 8A corresponds to FIG. 6B.

In the third exemplary embodiment, as FIG. 8A illustrates, the configuration of the housing 77, of the housing body 79, illustrated by the solid lines will be described.

As FIG. 8B illustrates, in the housing 77, a receiving portion 77*b* for receiving the housing 78 has facing surfaces 77*c* curved inward, and an interval K in the sub-scan direction S between the facing surfaces 77*c* varies depending on positions in the main scan direction L. That is, regarding the interval K in the sub-scan direction S between the facing surfaces 77c, the interval K between center portions 77e, in the main scan direction L, of the facing surfaces 77c is shorter than the interval K between end portions 77f, in the main scan direction L, of the facing surfaces 77c, and the receiving portion 77b thus has a so-called inward curve shape. On the other hand, the housing 78 has a linear shape. Thus, the housing 78 is in contact with the center portions 77e but is not in contact with the end portions 77f of the facing surfaces 77c of the housing 77.

Thus, when the housing 77 and the housing 78 are assembled (refer to FIG. 6B), it is possible to temporarily fix the housing 78 while the space between the center portions 77e of the receiving portion 77b of the housing 77 is widened. At this time, because the housing 78 is held with stability by receiving a pressing force in the sub-scan direction S, adjustment variation may be reduced, and an easy adjustment operation may be achieved, compared with a receiving portion 77b having a non-curved shape.

Note that, after the adjustment operation, fixation with the UV adhesive A (refer to FIG. 6A) is performed as in the first exemplary embodiment. Note that a fixation method other than UV adhesion may be adopted.

The receiving portion 77b curves inward in the third exemplary embodiment, and, whether the receiving portion 77b curves inward or not, the interval may be shortened at plural positions in the vicinity of the center.

Fourth Exemplary Embodiment

Figure 9A:
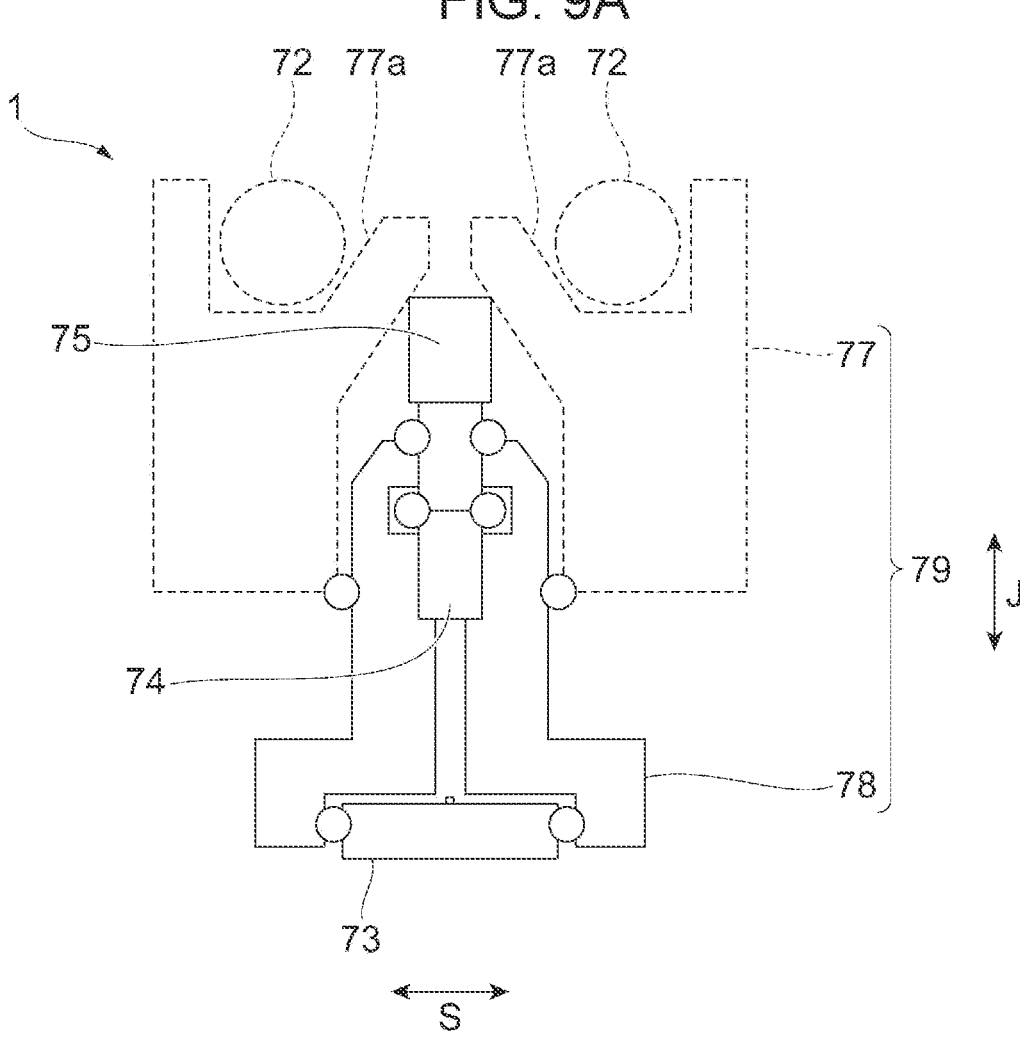
FIG. 9A and FIG. 9B illustrate a housing body according to a fourth exemplary embodiment, that is.
Figure 9B:
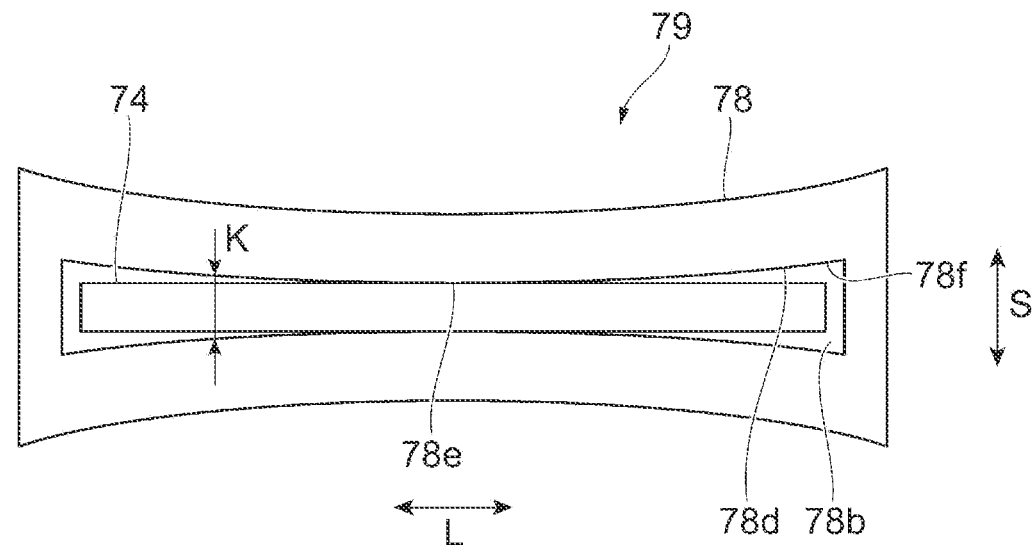

FIG. 9A and FIG. 9B illustrate a housing body 79 according to a fourth exemplary embodiment, that is, FIG. 9A illustrates schematically the configuration of the housing body 79, and FIG. 8B illustrates the assembly of the microlens array 74 in a housing 78 of the housing body 79.

In the fourth exemplary embodiment, as FIG. 9A illustrates, the configuration of the housing 78, of the housing body 79, illustrated by the solid lines will be described.

As FIG. 9B illustrates, in the housing 78, a receiving portion 78b for receiving the microlens array 74 has curved inner peripheral surfaces so that an interval K in the sub-scan direction S in the receiving portion 78b varies depending on positions in the main scan direction L, as with the receiving portion 77b of the third exemplary embodiment. That is, regarding the interval K in the sub-scan direction S between facing surfaces 78d that are the inner peripheral surfaces of the receiving portion 78b, the interval K between center portions 78e, in the main scan direction L, of the facing surfaces 78d is shorter than the interval K between end portions 78f, in the main scan direction L, of the facing surfaces 78d, and the receiving portion 78b thus has a so-called inward curve shape. On the other hand, the microlens array 74 has a linear shape. Thus, the microlens array 74 is in contact with the center portions 78e but is not in contact with the end portions 78f of the facing surfaces 78d of the housing 78.

Thus, when the housing 78 and the microlens array 74 are assembled (refer to FIG. 6A), it is possible to temporarily fix the microlens array 74 while the space between the center portions 78e of the receiving portion 78b of the housing 78 is widened. At this time, because the microlens array 74 is held with stability by receiving a pressing force in the sub-scan direction S, adjustment variation may be reduced, and an easy adjustment operation of the microlens array 74 may be achieved, compared with a receiving portion 78b having a non-curved shape. The receiving portion 78b is an example of a recessed portion that supports the lens body, and each of the facing surfaces 78d is an example of an inner peripheral surface.

Note that, after the adjustment operation, fixation with the UV adhesive A (refer to FIG. 6A) is performed as in the first exemplary embodiment. Note that a fixation method other than UV adhesion may be adopted.

The receiving portion 78b curves inward in the fourth exemplary embodiment as in the third exemplary embodiment, and, whether the receiving portion 78b curves inward or not, the interval K may be shortened at plural positions in a central region.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
An optical device comprising:
a radiation portion that sends light toward a predetermined position;
a lens body including a plurality of lenses that are arranged in an array direction and on which reflection light reflected at the predetermined position is incident;
a first support body having a light limiting portion and supporting the radiation portion, the light limiting portion extending in the array direction on an incident side of reflection light relative to the lens body, the light limiting portion limiting incidence of at least a portion of light having an influence on an image based on reflection light; and
a second support body supporting the lens body and being movable, relative to the first support body, in an optical axis direction of reflection light.

(((2)))
The optical device according to (((1))), wherein:
a light transmitting member with which the predetermined position is determined is provided; and
the radiation portion is positioned relative to the predetermined position by the first support body being pressed against the light transmitting member.

(((3)))
The optical device according to (((2))), wherein:
pressing of the first support body against the light transmitting member is performed at a position, in the optical axis direction, closer to the light transmitting member than an end portion, of the second support body, that is farther away from the light transmitting member than the other end portion in the optical axis direction.

(((4)))
The optical device according to any one of (((1))) to (((3))), wherein:
any one of the first support body and the second support body has a portion to be covered by the other support body.

(((5)))

The optical device according to (((4))), wherein:
the second support body has the portion to be covered.

(((6)))

The optical device according to any one of (((1))) to (((5))), wherein:

any one of the first support body and the second support body has facing surfaces extending in the array direction and facing one another, the second support body is moved in the optical axis direction by relative positional change between the facing surfaces of any one of the first support body and the second support body and a portion, of the other support body, that is in contact with the facing surfaces.

(((7)))

The optical device according to (((6))), wherein:
an interval between the facing surfaces varies depending on positions in the array direction.

(((8)))

The optical device according to (((7))), wherein:

each of the facing surfaces has, in the array direction, a center portion that is in contact with the portion of the other support body and an end portion; and the interval is shorter between the center portions than between the end portions.

(((9)))

The optical device according to any one of (((1))) to (((8))), wherein:

the second support body has a recessed portion having inner peripheral surfaces that are formed so as to surround the lens body and supporting the lens body;

in the recessed portion, an interval between facing inner peripheral surfaces of the inner peripheral surfaces varies in the array direction;

each of the facing inner peripheral surfaces has, in the array direction, a center portion that is in contact with the lens body and an end portion; and the interval is shorter between the center portions than between the end portions.

(((10)))

An image reading device comprising:

a radiation portion that sends light toward an image reading position;

a lens body including a plurality of lenses that are arranged in an array direction and on which reflection light reflected at the image reading position is incident;

a detection portion that receives light that forms an image due to the lens body;

a first support body having a light limiting portion and supporting the radiation portion, the light limiting portion extending in the array direction on an incident side of reflection light relative to the lens body, the light limiting portion limiting incidence of at least a portion of light having an influence on an image based on reflection light; and a second support body supporting the lens body and the detection portion and being movable, relative to the first support body, in an optical axis direction of reflection light.

(((11)))

An assembling method comprising:

causing a lens-body support body to support a lens body including a plurality of lenses that are arranged in an array direction and on which reflection light reflected at a predetermined position is incident;

causing a radiation portion that sends light toward the predetermined position to be supported by a radiation-portion support body having a light limiting portion extending in the array direction on an incident side of reflection light relative to the lens body, the light limiting portion limiting incidence of at least a portion of light having an influence on an image based on reflection light; and adjusting the positions of the lens body and the radiation portion by moving the lens-body support body, relative to the radiation-portion support body, in an optical axis direction of reflection light.

What is claimed is:

1. An optical device comprising:

a radiation portion that sends light toward a predetermined position;

a lens body including a plurality of lenses that are arranged in an array direction and on which reflection light reflected at the predetermined position is incident;

a first support body having a light limiting portion and supporting the radiation portion, the light limiting portion extending in the array direction on an incident side of reflection light relative to the lens body, the light limiting portion limiting incidence of at least a portion of light having an influence on an image based on reflection light; and a second support body supporting the lens body and being movable, relative to the first support body, in an optical axis direction of reflection light.

2. The optical device according to claim 1, wherein:

a light transmitting member with which the predetermined position is determined is provided, and the radiation portion is positioned relative to the predetermined position by the first support body being pressed against the light transmitting member.

3. The optical device according to claim 2, wherein:

pressing of the first support body against the light transmitting member is performed at a position, in the optical axis direction, closer to the light transmitting member than an end portion, of the second support body, that is farther away from the light transmitting member than the other end portion in the optical axis direction.

4. The optical device according to claim 1, wherein:

any one of the first support body and the second support body has a portion to be covered by the other support body.

5. The optical device according to claim 4, wherein:

the second support body has the portion to be covered.

6. The optical device according to claim 1, wherein:

any one of the first support body and the second support body has facing surfaces extending in the array direction and facing one another, the second support body is moved in the optical axis direction by relative positional change between the facing surfaces of any one of the first support body and the second support body and a portion, of the other support body, that is in contact with the facing surfaces.

7. The optical device according to claim 6, wherein:

an interval between the facing surfaces varies depending on positions in the array direction.

8. The optical device according to claim 7, wherein:

each of the facing surfaces has, in the array direction, a center portion that is in contact with the portion of the other support body and an end portion; and the interval is shorter between the center portions than between the end portions.

9. The optical device according to claim 1, wherein:

the second support body has a recessed portion having inner peripheral surfaces that are formed so as to surround the lens body and supporting the lens body;

in the recessed portion, an interval between facing inner peripheral surfaces of the inner peripheral surfaces varies in the array direction;

each of the facing inner peripheral surfaces has, in the array direction, a center portion that is in contact with the lens body and an end portion; and the interval is shorter between the center portions than between the end portions.

10. An image reading device comprising:

a radiation portion that sends light toward an image reading position;

a lens body including a plurality of lenses that are arranged in an array direction and on which reflection light reflected at the image reading position is incident;

a detection portion that receives light that forms an image due to the lens body;

a first support body having a light limiting portion and supporting the radiation portion, the light limiting portion extending in the array direction on an incident side of reflection light relative to the lens body, the light limiting portion limiting incidence of at least a portion of light having an influence on an image based on reflection light; and a second support body supporting the lens body and the detection portion and being movable, relative to the first support body, in an optical axis direction of reflection light.

11. An assembling method comprising:

causing a lens-body support body to support a lens body including a plurality of lenses that are arranged in an array direction and on which reflection light reflected at a predetermined position is incident;

causing a radiation portion that sends light toward the predetermined position to be supported by a radiation-portion support body having a light limiting portion extending in the array direction on an incident side of reflection light relative to the lens body, the light limiting portion limiting incidence of at least a portion of light having an influence on an image based on reflection light; and adjusting the positions of the lens body and the radiation portion by moving the lens-body support body, relative to the radiation-portion support body, in an optical axis direction of reflection light.

* * * * *